US012801677B2

(12) United States Patent
Boymel et al.

(10) Patent No.: US 12,801,677 B2
(45) Date of Patent: Nov. 17, 2026

(54) MULTI-PHASE TRAINING OF MACHINE LEARNING MODELS FOR SEARCH RANKING

(71) Applicant: YANDEX EUROPE AG, Lucerne (CH)

(72) Inventors: Aleksandr Alekseevich Boymel, Elektrostal (RU); Daria Mikhailovna Soboleva, Moscow (RU)

(73) Assignee: Y.E. HUB ARMENIA LLC, Yerevan (AM)

(*) Notice: Subject to any disclaimer, the term of this patent is extended or adjusted under 35 U.S.C. 154(b) by 1020 days.

(21) Appl. No.: 18/074,432

(22) Filed: Dec. 2, 2022

(65) Prior Publication Data

US 2023/0177097 A1 Jun. 8, 2023

(30) Foreign Application Priority Data

Dec. 2, 2021 (RU) ........................... RU2021135486

(51) Int. Cl.

*G06F 16/954* (2019.01)
*G06F 16/9535* (2019.01)
*G06N 20/00* (2019.01)

(52) U.S. Cl.

CPC ........ *G06F 16/954* (2019.01); *G06F 16/9535* (2019.01); *G06N 20/00* (2019.01)

(58) Field of Classification Search

CPC .... G06F 16/954; G06F 16/9535; G06N 20/00
See application file for complete search history.

(56) References Cited

U.S. PATENT DOCUMENTS 10,885,039 B2 1/2021 Hornkvist et al.
11,042,552 B2 6/2021 Barijough et al.
(Continued)

FOREIGN PATENT DOCUMENTS

CN 109299344 A 2/2019
CN 111737559 A 10/2020
(Continued)

OTHER PUBLICATIONS

Jiang, Y., Shang, Y., Liu, Z., Shen, H., Xiao, Y., Xu, S., . . . & Jin, D. (Nov. 2020). BERT2DNN: Bert distillation with massive unlabeled data for online e-commerce search. In 2020 IEEE International Conference on Data Mining (ICDM) (pp. 212-221). IEEE. (Year: 2020).*

(Continued)

*Primary Examiner* — Michael J Huntley
*Assistant Examiner* — Maggie Thanh Maido
(74) *Attorney, Agent, or Firm* — BCF LLP

(57) ABSTRACT

A method and system for training a machine learning model to rank digital objects generated using a search query are described. The method includes training the machine learning model in a first phase to determine a predicted user interaction parameter, based on a first plurality of training digital objects associated with past user interaction parameters. The machine learning model is then trained in a second phase to determine a synthetic assessor-generated label, based on a second plurality of training digital objects associated with search queries and labeled with human-assigned assessor-generated labels indicative of a relevance of the training digital objects to the queries. The machine learning model may be applied to the first plurality of training digital objects to generate a first augmented plurality of training digital objects, which may then be used to (Continued)

train the machine learning model to determine a relevance parameter for a digital object.

20 Claims, 6 Drawing Sheets

(56) References Cited

U.S. PATENT DOCUMENTS

| | | | | |
|---|---|---|---|---|
| 11,113,289 | B2 | 9/2021 | Chan et al. | |
| 2006/0143254 | A1 | 6/2006 | Chen et al. | |
| 2007/0106659 | A1 | 5/2007 | Lu et al. | |
| 2008/0028010 | A1 | 1/2008 | Ramsey | |
| 2009/0210381 | A1* | 8/2009 | Singh | G06F 16/338 707/999.102 |
| 2011/0029517 | A1* | 2/2011 | Ji | G06F 16/951 706/45 |
| 2016/0070705 | A1* | 3/2016 | Chevalier | G06F 16/24578 707/728 |
| 2017/0185602 | A1 | 6/2017 | Gusev et al. | |
| 2018/0121435 | A1 | 5/2018 | Chan et al. | |
| 2019/0179940 | A1* | 6/2019 | Ross | G06F 16/24535 |
| 2019/0286746 | A1 | 9/2019 | Li et al. | |
| 2019/0294692 | A1 | 9/2019 | Zhao et al. | |
| 2019/0325069 | A1 | 10/2019 | Santos et al. | |
| 2019/0370304 | A1 | 12/2019 | Li et al. | |
| 2019/0391982 | A1 | 12/2019 | Duzhik et al. | |
| 2020/0012652 | A1 | 1/2020 | Safronov et al. | |
| 2020/0089714 | A1 | 3/2020 | Melnik et al. | |
| 2020/0192904 | A1 | 6/2020 | Safronov et al. | |
| 2020/0192961 | A1 | 6/2020 | Safronov et al. | |
| 2020/0401644 | A1 | 12/2020 | Hewlett et al. | |
| 2021/0092160 | A1 | 3/2021 | Crabtree et al. | |
| 2021/0314349 | A1 | 10/2021 | Liu et al. | |

FOREIGN PATENT DOCUMENTS

| | | | |
|---|---|---|---|
| CN | 112084435 | A | 12/2020 |
| CN | 112256860 | A | 1/2021 |
| WO | 2020047336 | A1 | 3/2020 |

OTHER PUBLICATIONS

Mohan et al.,"A Fast Deep Learning Model for Textual Relevance in Biomedical Information Retrieval", Published on Feb. 26, 2018.

Nogueira et al., "Passage Re-ranking with Bert", Published on Apr. 14, 2020.

Nguyen "FAQ: All about the BERT algorithm in Google search", Article published on Nov. 5, 2019, https://searchengineland.com/faq-all-about-the-bert-algorithm-in-google-search-324193.

Boymel et al., "Pretraining and Scaling Transformer Models for Real-time Search Engine Ranking", Published in Aug. 14-18, 2021, Singapore, 9 pages, https://doi.org/10.1145/nnnnnnn.nnnnnnn.

English Machine Translation of CN112084435A retrieved on Espacenet on Dec. 5, 2022.

* cited by examiner

MULTI-PHASE TRAINING OF MACHINE LEARNING MODELS FOR SEARCH RANKING

CROSS-REFERENCE

The present application claims priority to Russian Patent Application No. 2021135486, entitled "Multi-Phase Training of Machine Learning Models for Search Ranking", filed Dec. 2, 2021, the entirety of which is incorporated herein by reference.

FIELD OF TECHNOLOGY

The present technology relates to machine learning methods, and more specifically, to methods and systems for training and using transformer-based machine learning models for ranking search results.

BACKGROUND

Web search is an important problem, with billions of user queries processed daily. Current web search systems typically rank search results according to their relevance to the search query, as well as other criteria. To determine the relevance of search results to a query often involves the use of machine learning algorithms that have been trained using multiple hand-crafted features to estimate various measures of relevance. This relevance determination can be seen as, at least in part, as a language comprehension problem, since the relevance of a document to a search query will have at least some relation to a semantic understanding of both the query and of the search results, even in instances in which the query and results share no common words, or in which the results are images, music, or other non-text results.

Recent developments in neural natural language processing include use of "transformer" machine learning models, as described in Vaswani et al., "Attention Is All You Need," *Advances in neural information processing systems*, pages 5998-6008, 2017. A transformer is a deep learning model (i.e. an artificial neural network or other machine learning model having multiple layers) that uses an "attention" mechanism to assign greater significance to some portions of the input than to others. In natural language processing, this attention mechanism is used to provide context to the words in the input, so the same word in different contexts may have different meanings. Transformers are also capable of processing numerous words or natural language tokens in parallel, permitting use of parallelism in training.

Transformers have served as the basis for other advances in natural language processing, including pretrained systems, which may be pretrained using a large dataset, and then "refined" for use in specific applications. Examples of such systems include BERT (Bidirectional Encoder Representations from Transformers), as described in Devlin et al., "BERT: Pre-training of Deep Bidirectional Transformers for Language Understanding," *Proceedings of NAACL-HLT* 2019, pages 4171-4186, 2019, and GPT (Generative Pre-trained Transformer), as described in Radford et al., "Improving Language Understanding by Generative Pre-Training," 2018.

While transformers have had substantial success in natural language processing tasks, there may be some practical difficulties in using them for search ranking. For example, many large search relevance datasets include non-text data, such as information on which links have been clicked by users, which may be useful in training a ranking model.

SUMMARY

Various implementations of the disclosed technology provide methods for efficiently training transformer models on query metadata, and search relevance data such as click data in a pretraining phase. The models may then be refined using smaller crowd-sourced relevance datasets for use in producing search result rankings. The disclosed technology improves the performance of the systems used for search result ranking to potentially accommodate tens of millions of active users and thousands of requests per second.

In accordance with one aspect of the present disclosure, the technology is implemented in a computer-implemented method of training a machine learning model to rank in-use digital objects, a given in-use digital object generated using a respective in-use search query. The method is executable by a processor and includes receiving, by the processor, a first plurality of training digital objects, a given one of the first plurality of training digital objects being associated with a past user interaction parameter indicative of user interaction of past users with the given one of the first plurality of training digital objects. The method further includes training, in a first training phase, based on the first plurality of training digital objects, the machine learning model for determining a respective predicted user interaction parameter of the given in-use digital object, the respective predicted user interaction parameter being indicative of the user interaction of future users with the given in-use digital object. The method also includes receiving, by the processor, a second plurality of training digital objects, a given one of the second plurality of training digital objects being associated with: (i) a respective training search query used for generating the given one of the second plurality of training digital objects; and (ii) a respective first assessor-generated label indicative of how relevant, to the respective training search query, the given one of the second plurality of training digital objects is as perceived by a respective human assessor that has assigned the first respective assessor-generated label. The method still further includes training, in a second training phase following the first training phase, based on the second plurality of training digital objects, the machine learning model for determining a respective synthetic assessor-generated label of the given in-use digital object, the respective synthetic assessor-generated label being indicative of how relevant, to the respective in-use search query, the given in-use digital object is as perceived by the respective human assessor if the given in-use digital object is presented to the respective human assessor. The method also includes applying, by the processor, the machine learning model to the first plurality of training digital objects to augment the given one of the first plurality of training digital objects with the respective synthetic assessor-generated label, thereby generating a first augmented plurality of training digital objects. The method also includes training the machine learning model based on the first augmented plurality of training digital objects to determine a respective relevance parameter of the given in-use digital object, the respective relevance parameter being indicative of how relevant the given in-use digital object is to the respective in-use search query.

In some implementations, the given one of the first plurality of training digital objects includes an indication of a digital document, the digital document being associated with document metadata. Additionally, training the machine learning model, based on the first plurality of training digital objects, further includes, in the first training phase: converting the document metadata into a text representation thereof comprising tokens; preprocessing the text representation to mask therein a number of masked tokens; and training the machine learning model, based on the first plurality of training digital objects, to determine a given one of the number of masked tokens based on a context provided by neighboring tokens. Additionally, the respective relevance parameter of the given in-use digital object is further indicative of a semantic relevance parameter, the semantic relevance parameter being indicative of how semantically relevant the respective in-use search query is to a content of the given in-use digital object. In some of these implementations, the document metadata includes at least one of: the respective training search query associated with the given one of the first plurality of training digital objects, a title of the digital document, a content of the digital document, and a web address associated with the digital document.

In some implementations, the method further includes determining the past user interaction parameter associated with the given one of the first plurality of training digital objects based on click data of the past users. In some of these implementations, the click data includes data of at least one click of at least one past user made in response to submitting the respective training search query associated with the given one of the first plurality of training digital objects.

In some implementations, the method further includes prior to the training the machine learning model to determine the respective relevance parameter of the given in-use digital object, receiving, by the processor, a third plurality of training digital objects, a given one of the third plurality of training digital objects being associated with: (i) the respective training search query used for generating the given one of the third plurality of training digital objects; and (ii) a respective second assessor-generated label indicative of how relevant, to the respective training search query, the given one of the third plurality of training digital objects is as perceived by the respective human assessor that has assigned the respective second assessor-generated label. In these implementations, the method also includes training, in a third training phase following the second training phase, based on the third plurality of training digital objects, the machine learning model for determining a respective refined synthetic assessor-generated label of the given in-use digital object, the respective refined synthetic assessor-generated label being indicative of how relevant, to the respective in-use search query, the given in-use digital object is as perceived by the respective human assessor if the given in-use digital object is presented to the respective human assessor. The method also includes applying, by the processor, the machine learning model to the first augmented plurality of training digital objects to augment a given one of the first augmented plurality of training digital objects with the respective refined synthetic assessor-generated label, thereby generating a second augmented plurality of training digital objects. The method in these implementations further includes training the machine learning model to determine the respective relevance parameter of the given in-use digital object based on the second augmented plurality of training digital objects. In some of these implementations, a given one of the first plurality of training digital objects, the second plurality of training digital objects, and the third plurality of training digital objects is at least partially different from any other one of the first plurality of training digital objects, the second plurality of training digital objects, and the third plurality of training digital objects. In some implementations a given one of the first plurality of training digital objects, the second plurality of training digital objects, and the third plurality of training digital objects is of a greater size than a subsequent respective one of the first plurality of training digital objects, the second plurality of training digital objects, and the third plurality of training digital objects.

In some implementations, after training the machine learning model to determine the respective relevance parameter of the given in-use digital object, the method further includes receiving, by the processor, a third plurality of training digital objects, a given one of the third plurality of training digital objects being associated with: (i) the respective training search query used for generating the given one of the third plurality of training digital objects; and (ii) a respective second assessor-generated label indicative of how relevant, to the respective training search query, the given one of the third plurality of training digital objects is as perceived by the respective human assessor that has assigned the respective second assessor-generated label. The method also includes training, based on the third plurality of training digital objects, the machine learning model to determine a respective refined relevance parameter of the given in-use digital object, the respective refined relevance parameter being indicative of how relevant the given in-use digital object is to the respective in-use search query. In some implementations, a given one of the first plurality of training digital objects, the second plurality of training digital objects, and the third plurality of training digital objects is at least partially different from any other one of the first plurality of training digital objects, the second plurality of training digital objects, and the third plurality of training digital objects. In some implementations, a given one of the first plurality of training digital objects, the second plurality of training digital objects, and the third plurality of training digital objects is of a greater size than a subsequent respective one of the first plurality of training digital objects, the second plurality of training digital objects, and the third plurality of training digital objects. In some implementations, the third plurality of training objects and the second plurality of training digital objects are the same.

In some implementations, in the first training phase, the machine learning model is trained to determine a rough initial estimate of the respective relevance parameter of the given in-use digital object. In each subsequent training phase, the machine learning model is trained to improve the rough initial estimate. In some of these implementations, improvement of the rough initial estimate is determined using a normalized discounted cumulative gain metric.

In some implementations, the machine learning model includes at least one learning model. In some of these implementations, the at least one learning model is a transformer-based learning model.

In some implementations, the machine learning model includes at least two learning models. A first one of the two learning models is trained to determine the respective synthetic assessor-generated label for the given in-use digital object for generating the first augmented plurality of training digital objects. A second one of the two learning models is trained to determine the respective relevance parameter of the given in-use digital object, based on the first augmented plurality of training digital objects. In some of these implementations, the first one of the two learning models is different from the second one. In some implementations, the first one of the two learning models is a transformer-based learning model.

In some implementations, the method further includes ranking the in-use digital objects in accordance with respective relevance parameters associated therewith. In some implementations, the method further includes ranking the in-use digital objects based on respective relevance parameters associated therewith, the ranking comprising using an other learning model having been trained to rank the in-use digital objects using the respective relevance parameters generated by the machine learning model as input features. In some of these implementations, the other learning model is a CatBoost decision tree learning model.

In accordance with another aspect of the present disclosure, the technology is implemented in a system for training a machine learning model to rank in-use digital objects, a given in-use digital object generated using a respective in-use search query. The system includes a processor, a memory coupled to the processor, and a machine learning training module residing in the memory and executed by the processor. The machine learning training module includes instructions that, when executed by the processor, cause the processor to: receive a first plurality of training digital objects, a given one of the first plurality of training digital objects being associated with a past user interaction parameter indicative of user interaction of past users with the given one of the first plurality of training digital objects; train, in a first training phase, based on the first plurality of training digital objects, the machine learning model for determining a respective predicted user interaction parameter of the given in-use digital object, the respective predicted user interaction parameter being indicative of the user interaction of future users with the given in-use digital object; receive a second plurality of training digital objects, a given one of the second plurality of training digital objects being associated with (i) a respective training search query used for generating the given one of the second plurality of training digital objects, and (ii) a respective first assessor-generated label indicative of how relevant, to the respective training search query, the given one of the second plurality of training digital objects is as perceived by a respective human assessor that has assigned the first respective assessor-generated label; train, in a second training phase following the first training phase, based on the second plurality of training digital objects, the machine learning model for determining a respective synthetic assessor-generated label of the given in-use digital object, the respective synthetic assessor-generated label being indicative of how relevant, to the respective in-use search query, the given in-use digital object is as perceived by the respective human assessor if the given in-use digital object is presented to the respective human assessor; apply the machine learning model to the first plurality of training digital objects to augment the given one of the first plurality of training digital objects with the respective synthetic assessor-generated label, thereby generating a first augmented plurality of training digital objects; and train the machine learning model based on the first augmented plurality of training digital objects to determine a respective relevance parameter of the given in-use digital object, the respective relevance parameter being indicative of how relevant the given in-use digital object is to the respective in-use search query.

In some implementations, the given one of the first plurality of training digital objects includes an indication of a digital document, the digital document being associated with document metadata. Additionally, the machine learning training module further comprises instructions that, when executed by the processor, cause the processor to train the machine learning model, based on the first plurality of training digital objects, in the first training phase by: converting the document metadata into a text representation thereof comprising tokens; preprocessing the text representation to mask therein a number of masked tokens; and training the machine learning model, based on the first plurality of training digital objects, to determine a given one of the number of masked tokens based on a context provided by neighboring tokens. In these implementations, the respective relevance parameter of the given in-use digital object is further indicative of a semantic relevance parameter, the semantic relevance parameter being indicative of how semantically relevant the respective in-use search query is to a content of the given in-use digital object.

In some implementations, the machine learning training module further comprises instructions that, when executed by the processor, cause the processor, prior to training the machine learning model to determine the respective relevance parameter of the given in-use digital object, to: receive a third plurality of training digital objects, a given one of the third plurality of training digital objects being associated with (i) the respective training search query used for generating the given one of the third plurality of training digital objects, and (ii) a respective second assessor-generated label indicative of how relevant, to the respective training search query, the given one of the third plurality of training digital objects is as perceived by the respective human assessor that has assigned the respective second assessor-generated label; train, in a third training phase following the second training phase, based on the third plurality of training digital objects, the machine learning model for determining a respective refined synthetic assessor-generated label of the given in-use digital object, the respective refined synthetic assessor-generated label being indicative of how relevant, to the respective in-use search query, the given in-use digital object is as perceived by the respective human assessor if the given in-use digital object is presented to the respective human assessor; apply the machine learning model to the first augmented plurality of training digital objects to augment a given one of the first augmented plurality of training digital objects with the respective refined synthetic assessor-generated label, thereby generating a second augmented plurality of training digital objects; and train the machine learning model to determine the respective relevance parameter of the given in-use digital object based on the second augmented plurality of training digital objects.

BRIEF DESCRIPTION OF THE DRAWINGS

These and other features, aspects and advantages of the present technology will become better understood with regard to the following description, appended claims and accompanying drawings where:

DETAILED DESCRIPTION

Figure 1:
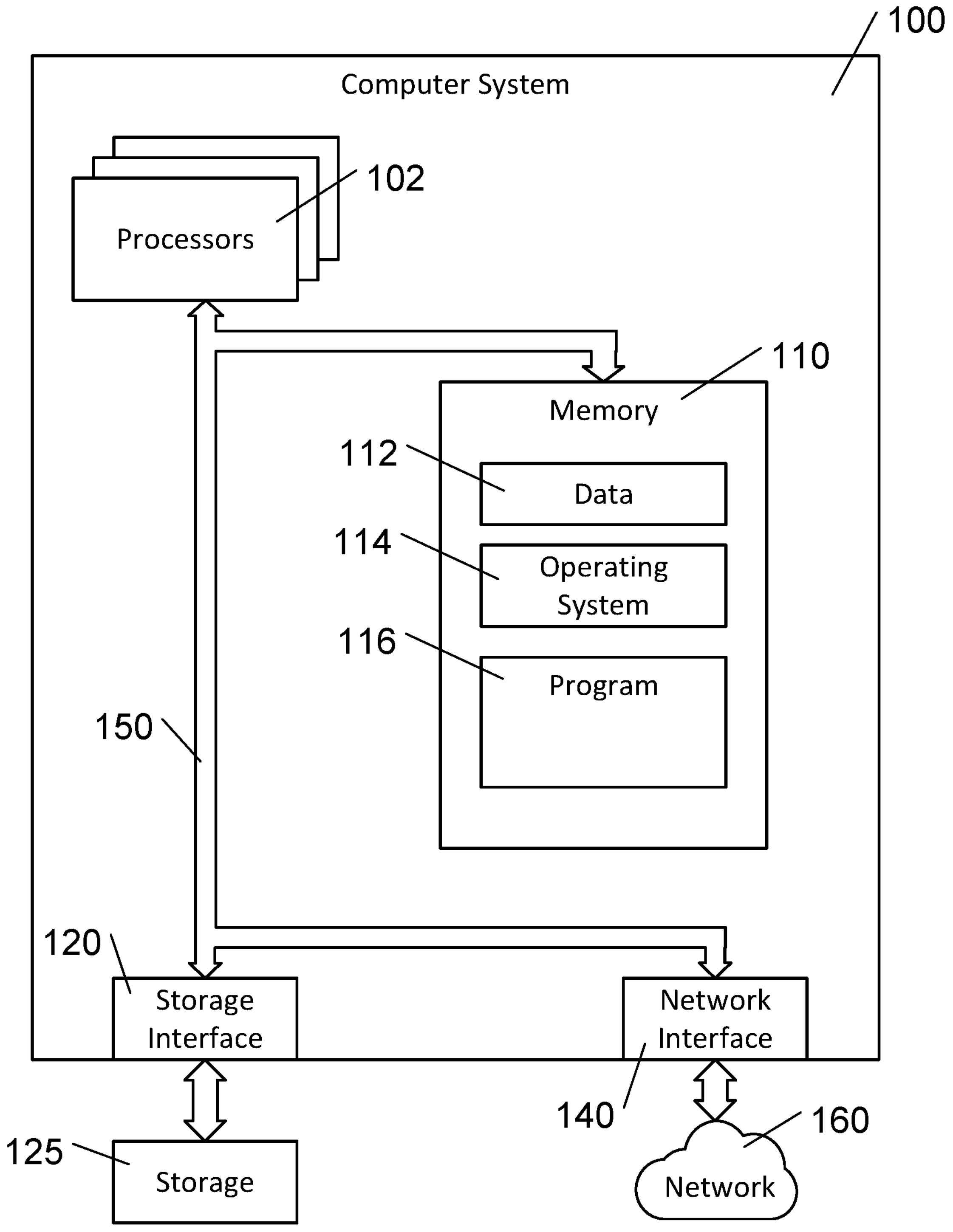
FIG. 1 depicts a schematic diagram of an example computer system for use in some implementations of systems and/or methods of the present technology.

Various representative implementations of the disclosed technology will be described more fully hereinafter with reference to the accompanying drawings. The present technology may, however, be implemented in many different forms and should not be construed as limited to the representative implementations set forth herein. In the drawings, the sizes and relative sizes of layers and regions may be exaggerated for clarity. Like numerals refer to like elements throughout.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

It will be understood that, although the terms first, second, third, etc. may be used herein to describe various elements, these elements should not be limited by these terms. These terms are used to distinguish one element from another. Thus, a first element discussed below could be termed a second element without departing from the teachings of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. By contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is only intended to describe particular representative implementations and is not intended to be limiting of the present technology. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The functions of the various elements shown in the figures, including any functional block labeled as a "processor," may be provided through the use of dedicated hardware as well as hardware capable of executing software. When provided by a processor, the functions may be provided by a single dedicated processor, by a single shared processor, or by a plurality of individual processors, some of which may be shared. In some implementations of the present technology, the processor may be a general-purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, an application-specific integrated circuit (ASIC), a field-programmable gate array (FPGA), a read-only memory (ROM) for storing software, a random-access memory (RAM), and non-volatile storage. Other hardware, conventional and/or custom, may also be included.

Software modules, or simply modules or units which are implied to be software, may be represented herein as any combination of flowchart elements or other elements indicating the performance of process steps and/or textual description. Such modules may be executed by hardware that is expressly or implicitly shown. Moreover, it should be understood that a module may include, for example, but without limitation, computer program logic, computer program instructions, software, stack, firmware, hardware circuitry, or a combination thereof, which provides the required capabilities.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

The present technology may be implemented as a system, a method, and/or a computer program product. The computer program product may include a computer-readable storage medium (or media) storing computer-readable program instructions that, when executed by a processor, cause the processor to carry out aspects of the disclosed technology. The computer-readable storage medium may be, for example, an electronic storage device, a magnetic storage device, an optical storage device, an electromagnetic storage device, a semiconductor storage device, or any suitable combination of these. A non-exhaustive list of more specific examples of the computer-readable storage medium includes: a portable computer disk, a hard disk, a random-access memory (RAM), a read-only memory (ROM), a flash memory, an optical disk, a memory stick, a floppy disk, a mechanically or visually encoded medium (e.g., a punch card or bar code), and/or any combination of these. A computer-readable storage medium, as used herein, is to be construed as being a non-transitory computer-readable medium. It is not to be construed as being a transitory signal, such as radio waves or other freely propagating electromagnetic waves, electromagnetic waves propagating through a waveguide or other transmission media (e.g., light pulses passing through a fiber-optic cable), or electrical signals transmitted through a wire.

It will be understood that computer-readable program instructions can be downloaded to respective computing or processing devices from a computer-readable storage medium or to an external computer or external storage device via a network, for example, the Internet, a local area network, a wide area network and/or a wireless network. A network interface in a computing/processing device may receive computer-readable program instructions via the network and forward the computer-readable program instructions for storage in a computer-readable storage medium within the respective computing or processing device.

Computer-readable program instructions for carrying out operations of the present disclosure may be assembler instructions, machine instructions, firmware instructions, configuration data for integrated circuitry, or either source code or object code written in any combination of one or more programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network.

All statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable program instructions. These computer-readable program instructions may be provided to a processor or other programmable data processing apparatus to generate a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein includes an article of manufacture including instructions which implement aspects of the function/act specified in the flowcharts, flow diagrams, state transition diagrams, pseudo-code, and the like.

The computer-readable program instructions may also be loaded onto a computer, other programmable data processing apparatus or other devices to cause a series of operational steps to be performed on the computer, other programmable apparatus or other devices to generate a computer-implemented process, such that the instructions which execute on the computer, other programmable apparatus, or other device implement the functions/acts specified in the flowcharts, flow diagrams, state transition diagrams, pseudo-code, and the like.

In some alternative implementations, the functions noted in flowcharts, flow diagrams, state transition diagrams, pseudo-code, and the like may occur out of the order noted in the figures. For example, two blocks shown in succession in a flowchart may, in fact, be executed substantially concurrently, or the blocks may sometimes be executed in the reverse order, depending upon the functionality involved. It will also be noted that each of the functions noted in the figures, and combinations of such functions can be implemented by special-purpose hardware-based systems that perform the specified functions or acts or by combinations of special-purpose hardware and computer instructions.

With these fundamentals in place, we will now consider some non-limiting examples to illustrate various implementations of aspects of the present disclosure.

Computer System

FIG. 1 shows a computer system 100. The computer system 100 may be a multi-user computer, a single user computer, a laptop computer, a tablet computer, a smartphone, an embedded control system, or any other computer system currently known or later developed. Additionally, it will be recognized that some or all the components of the computer system 100 may be virtualized and/or cloud-based. As shown in FIG. 1, the computer system 100 includes one or more processors 102, a memory 110, a storage interface 120, and a network interface 140. These system components are interconnected via a bus 150, which may include one or more internal and/or external buses (not shown) (e.g. a PCI bus, universal serial bus, IEEE 1394 "Firewire" bus, SCSI bus, Serial-ATA bus, etc.), to which the various hardware components are electronically coupled.

The memory 110, which may be a random-access memory or any other type of memory, may contain data 112, an operating system 114, and a program 116. The data 112 may be any data that serves as input to or output from any program in the computer system 100. The operating system 114 is an operating system such as MICROSOFT WINDOWS or LINUX. The program 116 may be any program or set of programs that include programmed instructions that may be executed by the processor to control actions taken by the computer system 100. For example, the program 116 may be a machine learning training module that trains a machine learning model as described below. The program 116 may also be a system that uses a trained machine learning model to rank search results, as described below.

The storage interface 120 is used to connect storage devices, such as the storage device 125, to the computer system 100. One type of storage device 125 is a solid-state drive, which may use an integrated circuit assembly to store data persistently. A different kind of storage device 125 is a hard drive, such as an electro-mechanical device that uses magnetic storage to store and retrieve digital data. Similarly, the storage device 125 may be an optical drive, a card reader that receives a removable memory card, such as an SD card, or a flash memory device that may be connected to the computer system 100 through, e.g., a universal serial bus (USB).

In some implementations, the computer system 100 may use well-known virtual memory techniques that allow the programs of the computer system 100 to behave as if they have access to a large, contiguous address space instead of access to multiple, smaller storage spaces, such as the memory 110 and the storage device 125. Therefore, while the data 112, the operating system 114, and the programs 116 are shown to reside in the memory 110, those skilled in the art will recognize that these items are not necessarily wholly contained in the memory 110 at the same time.

The processors 102 may include one or more microprocessors and/or other integrated circuits. The processors 102 execute program instructions stored in the memory 110. When the computer system 100 starts up, the processors 102 may initially execute a boot routine and/or the program instructions that make up the operating system 114.

The network interface 140 is used to connect the computer system 100 to other computer systems or networked devices (not shown) via a network 160. The network interface 140 may include a combination of hardware and software that allows communicating on the network 160. In some implementations, the network interface 140 may be a wireless network interface. The software in the network interface 140 may include software that uses one or more network protocols to communicate over the network 160. For example, the network protocols may include TCP/IP (Transmission Control Protocol/Internet Protocol).

It will be understood that the computer system 100 is merely an example and that the disclosed technology may be used with computer systems or other computing devices having different configurations.

Machine Learning Model Architecture

Figure 2:
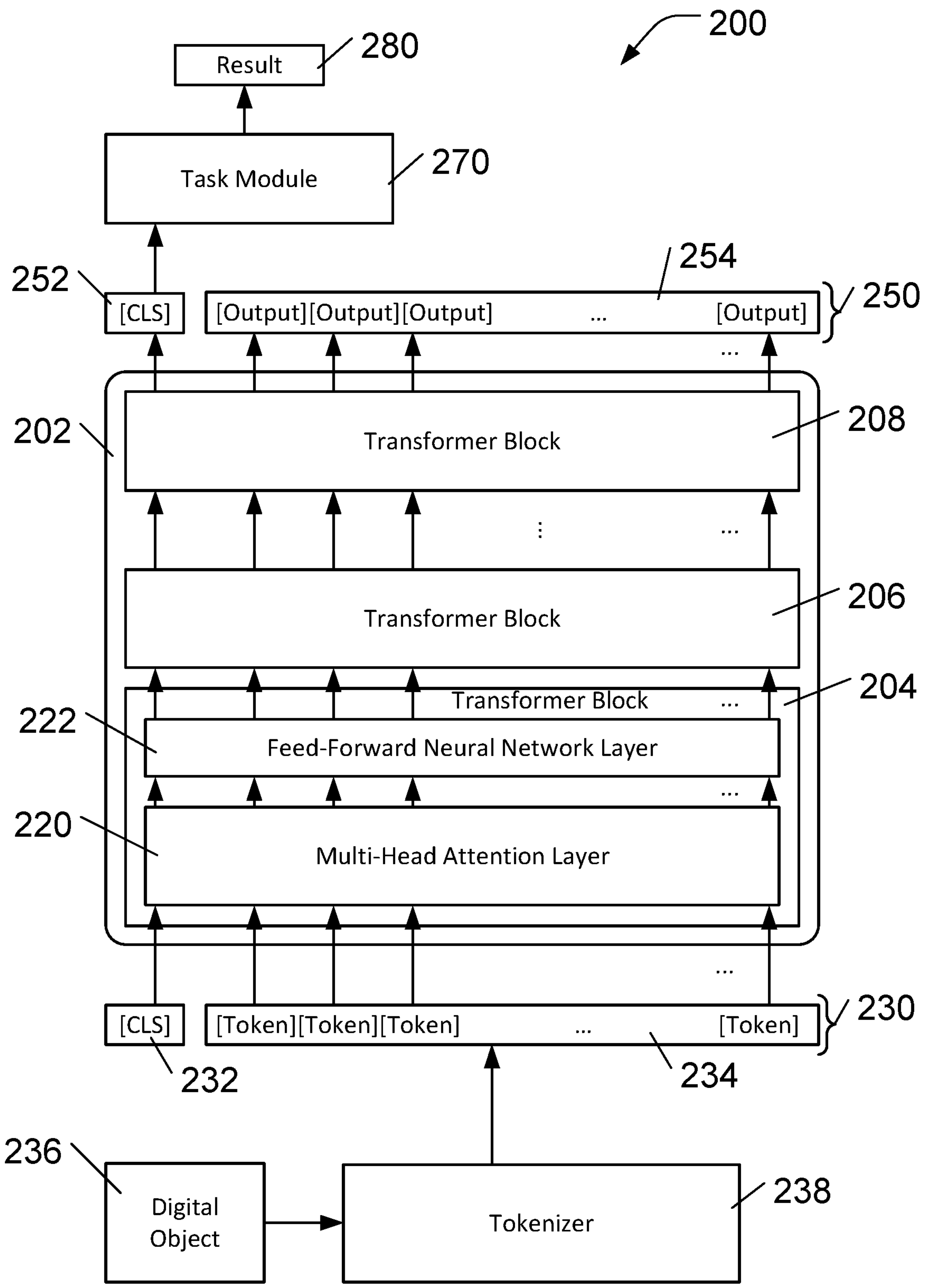
FIG. 2 shows a block diagram of a machine learning model architecture in accordance with various implementations of the disclosed technology.

FIG. 2 shows a block diagram of a machine learning model architecture 200 in accordance with various implementations of the disclosed technology. The machine learning model architecture 200 is based on the BERT machine learning model, as described, for example, in the Devlin et al. paper referenced above. Like BERT, the machine learning model architecture 200 includes a transformer stack 202 of transformer blocks, including, e.g., transformer blocks 204, 206, and 208.

Each of the transformer blocks 204, 206, and 208 includes a transformer encoder block, as described, e.g., in the Vaswani et al. paper, referenced above. Each of the transformer blocks 204, 206, and 208 includes a multi-head attention layer 220 (shown only in the transformer block 204 here, for purposes of illustration) and a feed-forward neural network layer 222 (also shown only in transformer block 204, for purposes of illustration). The transformer blocks 204, 206, and 208 are generally the same in structure, but (after training) will have different weights. In the multi-head attention layer 220, there are dependencies between the inputs to the transformer block, which may be used, e.g., to provide context information for each input based on each other input to the transformer block. The feed-forward neural network layer 222 generally lacks these dependencies, so the inputs to the feed-forward neural network layer 222 may be processed in parallel. It will be understood that although only three transformer blocks (transformer blocks 204, 206, and 208) are shown in FIG. 2, in actual implementations of the disclosed technology, there may be many more such transformer blocks in the transformer stack 202. For example, some implementations may use 12 transformer blocks in the transformer stack 202.

The inputs 230 to the transformer stack 202 include tokens, such as [CLS] token 232, and tokens 234. The tokens 234 may, for example represent words or portions of words. The [CLS] token 232 is used as a representation for classification for the entire set of tokens 234. Each of the tokens 234 and the [CLS] token 232 is represented by a vector. In some implementations, these vectors may each be, e.g., 768 floating point values in length. It will be understood that a variety of compression techniques may be used to effectively reduce the sizes of the tokens. In various implementations, there may be a fixed number of tokens 234 that are used as inputs 230 to the transformer stack 202. For example, in some implementations, 1024 tokens may be used, while in other implementations, the transformer stack 202 may be configured to take 512 tokens (aside from the [CLS] token 232). Inputs 230 that are shorter than this fixed number of tokens 234 may be extended to the fixed length by adding padding tokens.

In some implementations, the inputs 230 may be generated from a digital object 236, such as an item from a training set, using a tokenizer 238. The architecture of the tokenizer 238 will generally depend on the digital object 236 that serve as input to the tokenizer 238. For example, the tokenizer 238 may involve use of known encoding techniques, such as byte-pair encoding, as well as use of pre-trained neural networks for generating the inputs 230.

The outputs 250 of the transformer stack 202 include a [CLS] output 252, and vector outputs 254, including a vector output for each of the tokens 234 in the inputs 230 to the transformer stack 202. The outputs 250 may then be sent to a task module 270. In some implementations, as is shown in FIG. 2, the task module uses only the [CLS] output 252, which serves as a representation of the entire set of outputs 254. This is most useful when the task module 270 is being used as a classifier, or to output a label or value that characterizes the entire input digital object 236, such as generating a relevance score or document click probability. In some implementations (not shown in FIG. 2) all or some of the outputs 254, and possibly the [CLS] output 252 may serve as inputs to the task module 270. This is most useful when the task module 270 is being used to generate labels or values for the individual input tokens 234, such as for prediction of a masked or missing token or for named entity recognition. In some implementations, the task module 270 may include a feed-forward neural network (not shown) that generates a task-specific result 280, such as a relevance score or click probability. Other models could also be used in the task module 270. For example, the task module 270 may itself be a transformer or other form of neural network. Additionally, the task-specific result may serve as an input to other models, such as a CatBoost model, as described in Dorogush et al., "CatBoost: gradient boosting with categorical features support", *NIPS* 2017.

It will be understood that the architecture described with reference to FIG. 2 has been simplified for ease of understanding. For example, in an actual implementation of the machine learning model architecture 200, each of the transformer blocks 204, 206, and 208 may also include layer normalization operations, the task module 270 may include a softmax normalization function, and so on. One of ordinary skill in the art would understand that these operations are commonly used in neural networks and deep learning models such the machine learning model architecture 200.

Pretraining and Finetuning

Figure 3:
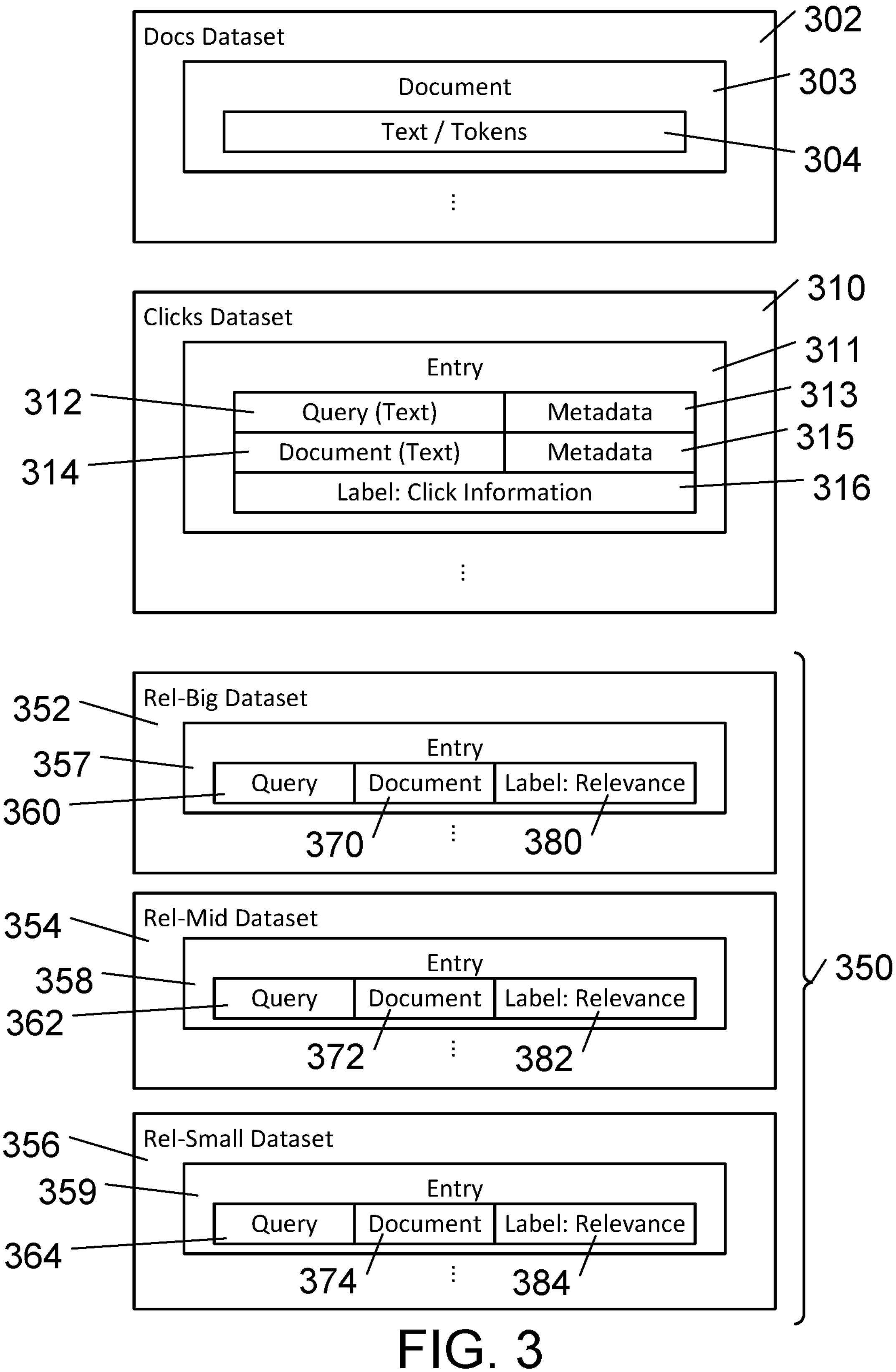
FIG. 3 shows diagrams of datasets that may be used for pretraining and finetuning the machine learning model for use in ranking search results in accordance with various implementations of the disclosed technology.

In accordance with various implementations of the disclosed technology, the machine learning model architecture presented with reference to FIG. 2 may be trained through a pretraining and finetuning process, as described below. FIG. 3 shows datasets that may be used for pretraining and finetuning the machine learning model for use in ranking search results.

The datasets include a "Docs" dataset 302, which is a large collection of unlabeled documents 303, having a maximum length of 1024 tokens 304. The Docs dataset 302 is used for pretraining with a masked language modeling (MLM—see below) objective. Pretraining on the Docs dataset 302 is used to provide a kind of underlying language model that helps to improve downstream training and training stability. In some implementations, the Docs dataset 302 may include approximately 600 million training digital objects (i.e., unlabeled documents having a maximum length of 1024 tokens).

The datasets also include a "Clicks" dataset 310, the entries 311 of which include a user query 312, and a document 314, from the search results of the user query 312, and are labeled with click information 316, which indicates whether the user clicked on the document 314. In addition to the text of the query, the query 312 includes query metadata 313, which may include, for example, the geographical region from which the query originated. Similarly, the document 314 includes both the text of the document and document metadata 315, which may include the document title and the web address (e.g., in the form of a URL) of the document.

In some implementations, the click information 316 may be pre-processed to indicate that the user clicked on the document only in the case of a "long click," in which the user remained in the document that was clicked for a "long" time. Long clicks are a commonly used measure of the relevance of a search result to a query, since they indicate that the user may have found relevant information in the document, rather than just clicking on the document, and quickly returning to the search results. For example, in some implementations, a "long click" may indicate that the user remained in the document for at least 120 seconds.

Because the Clicks dataset 310 is based on information that is routinely gathered as a result of users using a search engine, it is extremely large. In some implementations, for example, the Clicks dataset 310 may include approximately 23 billion training digital objects (i.e., entries including a query and document, and labeled with click information). Due to its scale, the Clicks dataset 310 forms the main part of the training pipeline, and is used in pretraining, as described below.

The datasets further include relevance datasets 350, which are used for finetuning, as discussed below. In some implementations, the relevance datasets 350 include a "Rel-Big" dataset 352, a "Rel-Mid" dataset 354, and a "Rel-Small" dataset 356. The entries, 357, 358, and 359, respectively, in these datasets include a query 360, 362, and 364, respectively, and a document 370, 372, and 374, respectively. The entries in the relevance datasets 350 are labeled with a relevance score 380, 382, and 384, respectively. The relevance scores 380, 382, and 384 are based on human assessor input on how relevant the documents are to the search query. This human assessor input may be provided via crowdsourcing, or other means of collecting data from people regarding the relevance of a document to a query.

Because the relevance scores 380, 382, and 384 are based on input from human assessors, the relevance datasets 350 may take a longer time and may be more expensive to collect than the other datasets used in training the machine learning model. Because of this, the relevance datasets 350 are much smaller than the other datasets, and are used for finetuning, rather than for pretraining. In some implementations, for example, the Rel-Big dataset 352 may include approximately 50 million training digital objects (i.e., entries), the Rel-Mid dataset 354 may include approximately 2 million training digital objects, and the Rel-Small dataset 356 may include approximately 1 million training digital objects. In general, the relevance datasets 350 vary in size, age, and similarity to recent methods of computing relevance scores, with the Rel-Big dataset 352 being the largest and oldest (both in terms of age of the data and methods of computing relevance scores), and the Rel-Small dataset 356 being the smallest and newest.

Figure 4:
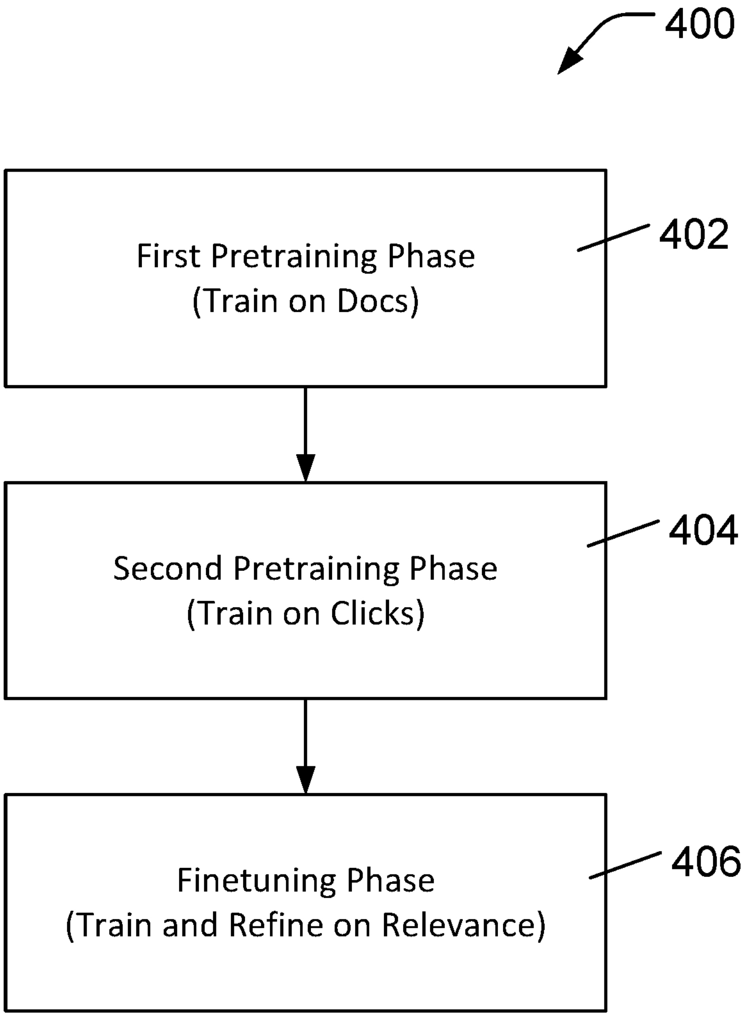
FIG. 4 shows a block diagram of the phases of pretraining and finetuning that are performed to train a machine learning model to generate relevance scores in accordance with various implementations of the disclosed technology.

FIG. 4 shows a block diagram 400 of the phases of pretraining and finetuning that are performed to train a machine learning model to generate relevance scores in accordance with various implementations of the disclosed technology. In a first phase 402, the machine learning model is pretrained using the Docs dataset 302 (as shown in FIG. 3), using a masked language modeling (MLM) objective.

The masked language modeling objective is based on one of two unsupervised learning objectives used in BERT, which is used to learn text representations from collections of unlabeled documents (note that the other unsupervised learning objective used in BERT is a next sentence prediction objective, which is not generally used in implementations of the disclosed technology). To pretrain with the MLM objective, one or more tokens in the input to the machine learning model are masked by replacing them with a special [MASK] token (not shown). The machine learning model is trained to predict the probabilities of a masked token corresponding to tokens in the vocabulary of tokens. This is done based on the outputs (each of which is a vector) of the last layer of the transformer stack (see above) of the machine learning model that correspond to the masked tokens. Since we know the actual masked tokens (i.e., the "ground truth"), a cross-entropy loss representing a measure of the distance of the predicted probabilities from the actual masked tokens (referred to herein as "MLM loss") is calculated and used to adjust the weights in the machine learning model to reduce the loss.

In a second pretraining phase 404, the training digital objects of the Clicks dataset 310 (as shown in FIG. 3) are used for pretraining the machine learning model. This is done by tokenizing the query, including the query metadata, and the document, including the document metadata. The tokenized query and document are used as input to the machine learning model, with one or more of the tokens masked, as was done in the first phase. In this way, the query metadata and document metadata, including information such as the web address of the document and the geographical region of the query are directly fed into the machine learning model, along with the natural language text of the query and document.

To convert the query and document of a training digital object from the Clicks dataset into tokens, including metadata, a pre-built vocabulary of tokens that are suited to natural language text, as well as to the kinds of metadata that are used in the Clicks dataset may be used. In some implementations, this may be done by using the WordPiece byte-pair encoding scheme used in BERT with a sufficiently large vocabulary size. For example, in some implementations, the vocabulary size may be approximately 120,000 tokens. In some implementations, there may be preprocessing of the text, such as converting all words to lowercase and performing Unicode NFC normalization. A WordPiece byte-pair encoding scheme that may be used in some implementations to build the token vocabulary is described, for example, in Rico Sennrich et al., "Neural Machine Translation of Rare Words with Subword Units", *Proceedings of the 54th Annual Meeting of the Association for Computational Linguistics* (*Volume 1: Long Papers*), pages 1715-1725, 2016.

In the second pretraining phase 404, the machine learning model is trained using the MLM loss, as described above, with the masked tokens. The machine learning model is also configured with a neural network-based classifier as a task module (as discussed with reference to FIG. 2) that predicts a click probability for the document. In some implementations, the predicted click probability may be determined based on the [CLS] output. Since the training digital objects in the Clicks dataset include information on whether the user clicked on the document or not, this ground truth can be used to determine, e.g., a cross-entropy loss (referred to as a click prediction loss), which represents a distance or difference between the predicted click probability and the ground truth. This click prediction loss may be used to adjust the weights in the machine learning model to train the model.

Although the Clicks dataset collected from activity logs may serve as a proxy for relevance, it might not properly reflect the actual relevance of a document to the query. This is addressed in the finetuning phase 406 by using the relevance datasets (discussed above) to train the machine learning model on documents that have been manually labeled with their relevance to the query by human assessors.

In some implementations, the finetuning phase 406 is performed first using the Rel-Big dataset (as discussed above with reference to FIG. 3), which is the largest, but also the oldest, of the relevance datasets. The queries and documents are tokenized, as discussed above, and provided to the machine learning model as inputs. The machine learning model uses a neural network-based task module to generate a predicted relevance score. In some implementations, the task module may determine the predicted relevance score based on the [CLS] output. The Rel-Big dataset includes a relevance score that has been determined by a human assessor, which may serve as the ground truth in training the machine learning model. This ground truth can be used to determine, e.g., a cross-entropy loss representing a distance or difference between the predicted relevance score and the ground truth, which may be used to adjust the weights in the machine learning model.

In some implementations, relabeling the large Clicks dataset and retraining the model using the relabeled dataset may be used during finetuning to improve the performance of the machine learning model. This may be done by using the machine learning model, trained as discussed above to generate predicted relevance scores for the data objects in the Clicks dataset, effectively relabeling the data objects in the Clicks dataset to generate an augmented Clicks dataset with synthetic assessor-generated relevance labels. The augmented Clicks dataset may then be used to retrain the machine learning model to predict relevance scores, using the synthetic assessor-generated relevance labels as ground truth.

It will be understood that a similar approach, in which a first model is used to augment or label a dataset, which is then used to train a second model, may be used to effectively "distill" the knowledge embedded in the first model into the second model. In effect, the first model becomes a "teacher" for the second model. Such distillation techniques may be used with different model architectures, such that the first model architecture is different than the second model architecture. For example, the second model may be a smaller neural network than the first model, providing substantially similar, or even refined results with, e.g., fewer layers (and, therefore, possibly faster in-use execution).

In some implementations, this finetuning may be repeated using other datasets from the relevance datasets. For example, the machine learning model could first be finetuned using the Rel-Big dataset, then refined using the Rel-Mid dataset, and then further refined using the Rel-Small dataset. In some implementations, all or some of these stages of refining the machine learning model may also involve relabeling the Clicks dataset (or another large dataset), and retraining the machine learning model, as described above.

Using this multi-phase approach, the machine learning model can be seen as providing a rough initial estimate of relevance of a document to a query after being initially trained using the Clicks dataset and improving that rough initial estimate in each subsequent stage of finetuning. To determine the improvements over the initial estimate at each stage of finetuning, a metric that is commonly applied to ranking tasks, such as a normalized discounted cumulative gain metric, may be used.

Figure 5:
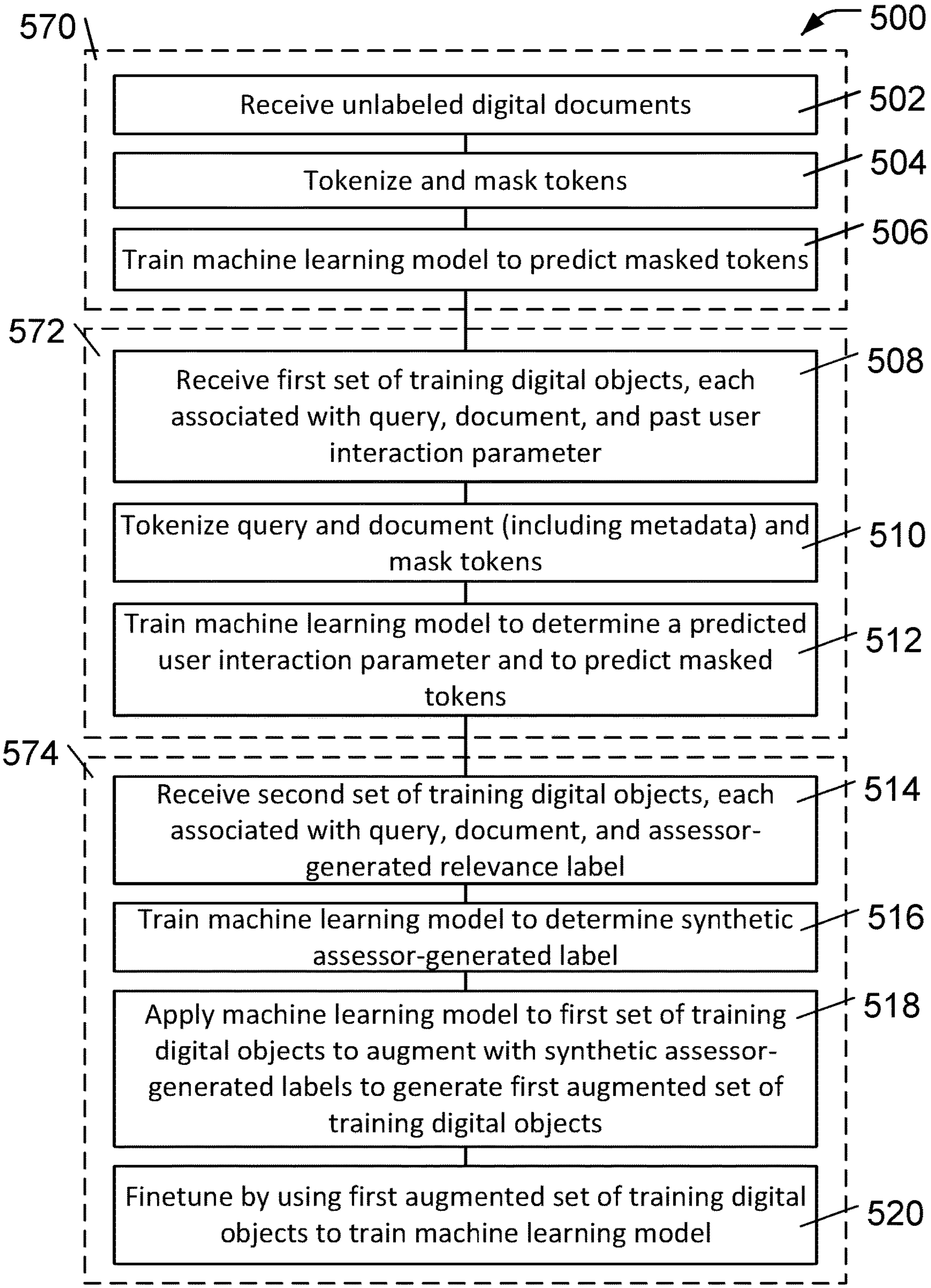
FIG. 5 shows a flowchart for a computer-implemented method of training a machine learning model in accordance with various implementations of the disclosed technology.

FIG. 5 shows a flowchart 500 for a computer-implemented method of training a machine learning model in accordance with various implementations of the disclosed technology. The flowchart 500 includes a first pretraining phase 570, a second pretraining phase 572, and a finetuning phase 574.

At block 502 of the first pretraining phase 570, a set of unlabeled natural language digital documents is received by a processor. At block 504, the processor converts a digital document from the set of unlabeled natural language digital documents into a set of tokens, and one or more tokens are masked.

At block 506, the machine learning model is trained using the masked set of tokens as input. The outputs of the machine learning model corresponding to the tokens that were masked are used, along with the actual tokens that were masked, to determine a loss (e.g., a cross-entropy loss), which is used to adjust the weights of the machine learning model. It will be understood that blocks 504 and 506 may be repeated for all, or a subset of, the unlabeled natural language digital documents. In some implementations, the first pretraining phase 570 may be omitted, or the training may start with the second pretraining phase, using, e.g., a "standard" pretrained BERT model.

At block 508 of the second pretraining phase 572, the processor receives a first set of training digital objects. The respective training digital objects in the first set of training digital objects are associated with a past user interaction parameter. This past user interaction parameter represents a user interaction of a past user with the training digital object, such as a click on a digital document associated with the training digital object, the digital document having been responsive to a query associated with the training digital object. In some implementations, the training digital object is associated with a query, including the text of the query as well as query metadata, a document, including the text of the document as well as document metadata, and a past user interaction. The query metadata may include, e.g., the geographical region from which the query originated. The document metadata may include, e.g., the web address of the document, such as the URL for the document, and the document title. In some implementations the query, including its metadata, may be included in the document metadata.

At block 510, the processor converts a query and a digital document associated with a training digital object, including the metadata associated with the query and the digital document, into tokens, and one or more of the tokens are masked to generate input tokens. This "tokenization" may be performed using a pre-built vocabulary of tokens, that may be determined in some implementations using byte-pair encoding.

At block 512, the machine learning model is trained to determine a predicted user interaction parameter, such as the probability of a user clicking on the document, indicating that the user believed the document to be relevant to the query. This is done using the predicted user interaction parameter and the past user interaction parameter to determine a loss that is used to adjust weights in the machine learning model. In some implementations, the machine learning model may further be trained on the input tokens to predict the masked tokens based on context provided by neighboring tokens. The outputs of the machine learning model corresponding to the tokens that were masked are used, along with the actual tokens that were masked, to determine a loss, which is used to adjust the weights of the machine learning model. By training on these masked tokens, the predictions made by the machine learning model may include information indicative of a semantic relevance parameter, which indicates how semantically relevant the search query is to the content of an input digital object. It will be understood that blocks 510 and 512 may be repeated for all or a subset of the set of training digital objects.

At block 514 of the finetuning phase 574, the processor receives a second set of training digital objects, in which a training digital object in the second set of training digital objects is associated with: a search query, which may include metadata; a digital document, which may include metadata; and an assessor-generated label. The assessor-generated label indicates how relevant the training digital object (in particular, in some implementations, the digital document) is to the search query, as perceived by a human assessor who has assigned the assessor-generated label.

At block 516, the processor trains the machine learning model to determine a synthetic assessor-generated label for the training digital object. This synthetic assessor-generated label is the machine learning model's prediction of how relevant the training digital object is to the search query. The training may be done by providing the machine learning model with a tokenized representation of the training digital object (including the search query and document) and using the machine learning model to generate a synthetic assessor-generated label. The synthetic assessor-generated label and the assessor-generated label generated by a human assessor are used to determine a loss, which may be used to adjust weights in the machine learning model to finetune the machine learning model. In will be understood that block 516 may be repeated for all or a subset of the second set of training digital objects.

At block 518, the machine learning model is further finetuned by the processor applying the machine learning model to all or a subset of the first set of training digital objects to augment the first set of training digital objects with synthetic assessor-generated labels, generating a first augmented set of training digital objects. At block 520, the machine learning model is finetuned using the first augmented set of training digital objects for training the machine learning model, substantially as described above, with reference to block 516.

It will be understood that all or part of the finetuning phase 574 may be repeated with different sets of training digital objects that include assessor-generated labels, to successively further refine the machine learning model. For example, in some implementations, after finetuning as described above has been performed, the processor receives a third set of training digital objects, in which a training digital object in the third set of training digital objects is associated with: the search query used for generating the training digital object, which may include metadata; a digital document, which may include metadata; and an assessor-generated label. As before, the assessor-generated label indicates how relevant the training digital object (in particular, in some implementations, the digital document) is to the search query, as perceived by a human assessor who has assigned the assessor-generated label. This additional set of training digital objects may be different from any other set of digital training objects that was used in the training as described above, or may, e.g., be the same as the second set of training digital objects. Additionally, the third set of training digital objects may have a different size than other sets of training digital objects that are used for training and/or finetuning the machine learning model.

The machine learning model is finetuned using the additional set of training digital objects for training the machine learning model, substantially as described above, with reference to block 516. Once this further training is performed, the model may be used to generate a refined relevance label.

Figure 6:
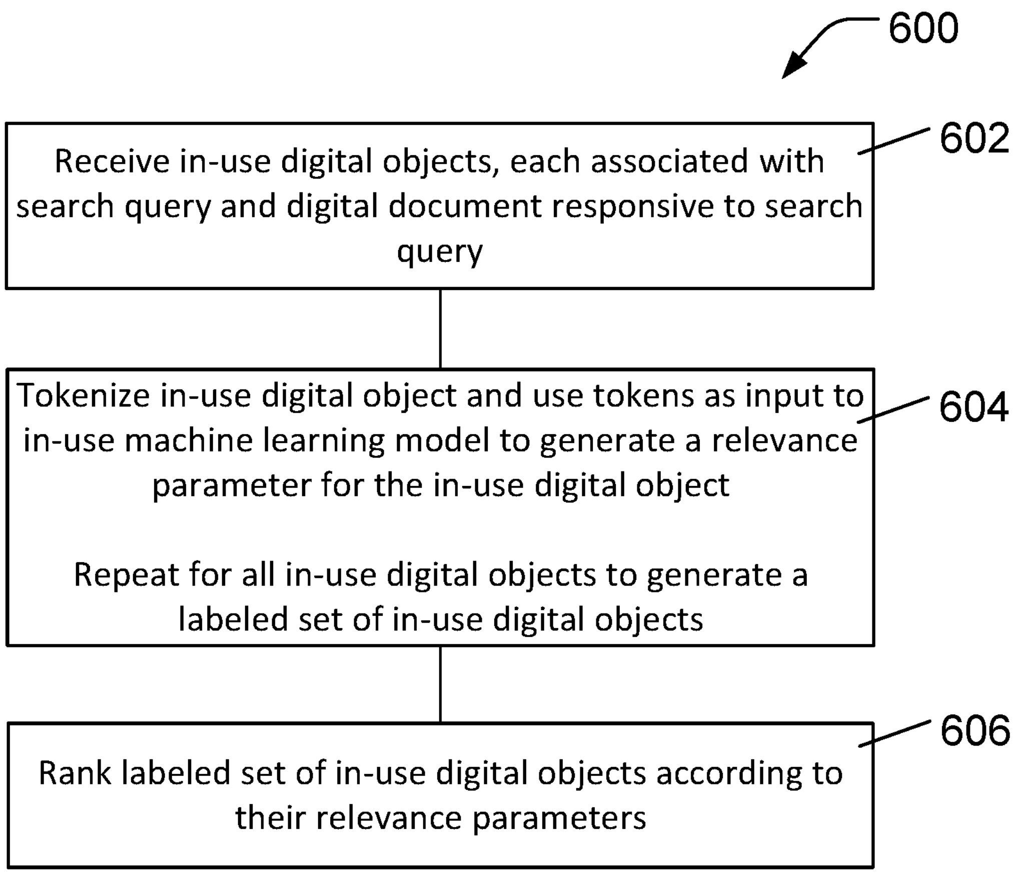
FIG. 6 shows a flowchart of the fully trained machine learning model in use to rank search results in accordance with various implementations of the disclosed technology.

FIG. 6 shows a flowchart 600 of the fully trained machine learning model in use to rank search results. At block 602, a processor receives a set of in-use digital objects. Each of the in-use digital objects is associated with the search query (including metadata) that was entered by a user, and a digital document (including metadata) that was returned in response to the query. For example, if a search engine finds 75 documents that are responsive to the query, then the set of in-use digital objects would include 75 in-use digital objects, each of which would include the query (including metadata) and one of the documents (including metadata).

At block 604, the processor tokenizes an in-use digital object from the set of in-use digital objects and uses the resulting tokens as input to the in-use machine learning model. The in-use machine learning model generates a relevance parameter for the in-use digital object. The relevance parameter represents the prediction of the in-use machine learning model of the relevance of the in-use digital object (e.g., the document associated with the in-use digital object) to the query. The in-use digital object is labeled with the relevance parameter. Block 604 may be repeated for all or a subset of the set of in-use digital objects, to generate a labeled set of in-use digital objects.

At block 606, the labeled set of in-use digital objects are ranked according to their relevance parameters. In some implementations, this may be done by using a different machine learning model that has been previously trained to rank the labeled set of in-use digital objects using their relevance parameters as input features. In some implementations, this different machine learning model may be a CatBoost decision tree learning model.

It will also be understood that, although the embodiments presented herein have been described with reference to specific features and structures, various modifications and combinations may be made without departing from such disclosures. For example, various optimizations that have been applied to neural networks, including transformers and/or BERT may be similarly applied with the disclosed technology. Additionally, optimizations that speed up in-use relevance determinations may also be used. For example, in some implementations, the transformer model may be split, so that some of the transformer blocks are split between handling a query and handling a document, so the document representations may be pre-computed offline and stored in a document retrieval index. The specification and drawings are, accordingly, to be regarded simply as an illustration of the discussed implementations or embodiments and their principles as defined by the appended claims, and are contemplated to cover any and all modifications, variations, combinations or equivalents that fall within the scope of the present disclosure.

What is claimed is:

1. A computer-implemented method of training a machine learning model to rank in-use digital objects, a given in-use digital object generated using a respective in-use search query, the method executable by at least one processor, the method comprising:

receiving, by the at least one processor, a first plurality of training digital objects, a given one of the first plurality of training digital objects being associated with a past user interaction parameter indicative of user interaction of past users with the given one of the first plurality of training digital objects;

training, in a first training phase, based on the first plurality of training digital objects, the machine learning model for determining a respective predicted user interaction parameter of the given in-use digital object, thereby generating a first plurality of weights of the machine learning model, the respective predicted user interaction parameter being indicative of a user interaction of future users with the given in-use digital object;

receiving, by the at least one processor, a second plurality of training digital objects, a given one of the second plurality of training digital objects being associated with:

(i) a respective training search query used for generating the given one of the second plurality of training digital objects; and (ii) a respective first assessor-generated label indicative of how relevant, to the respective training search query, the given one of the second plurality of training digital objects is as perceived by a respective human assessor that has assigned the first respective assessor-generated label;

training, in a second training phase following the first training phase, based on the second plurality of training digital objects, the machine learning model having the first plurality of weights for determining a respective synthetic assessor-generated label of the given in-use digital object, thereby adjusting the first plurality of weights to generate a second plurality of weights of the machine learning model, the respective synthetic assessor-generated label being indicative of how relevant, to the respective in-use search query, the given in-use digital object is as perceived by the respective human assessor if the given in-use digital object is presented to the respective human assessor;

applying, by the at least one processor, the machine learning model having the second plurality of weights to the first plurality of training digital objects to augment the given one of the first plurality of training digital objects with the respective synthetic assessor-generated label, thereby generating a first augmented plurality of training digital objects;

training the machine learning model having the second plurality of weights based on the first augmented plurality of training digital objects to determine a respective relevance parameter of the given in-use digital object, thereby adjusting the second plurality of weights to generate a third plurality of weights of the machine learning model, the respective relevance parameter being indicative of how relevant the given in-use digital object is to the respective in-use search query; and using the machine learning model having the third plurality of weights for ranking the in-use digital objects.

2. The method of claim 1, wherein:

the given one of the first plurality of training digital objects includes an indication of a digital document, the digital document being associated with document metadata; and the training the machine learning model, based on the first plurality of training digital objects, further comprises, in the first training phase:

converting the document metadata into a text representation thereof comprising tokens;

preprocessing the text representation to mask therein a number of masked tokens; and training the machine learning model, based on the first plurality of training digital objects, to determine a given one of the number of masked tokens based on a context provided by neighboring tokens; and wherein the respective relevance parameter of the given in-use digital object is further indicative of a semantic relevance parameter, the semantic relevance parameter being indicative of how semantically relevant the respective in-use search query is to a content of the given in-use digital object.

3. The method of claim 2, wherein the document metadata includes at least one of: the respective training search query associated with the given one of the first plurality of training digital objects, a title of the digital document, a content of the digital document, and a web address associated with the digital document.

4. The method of claim 1, further comprising determining the past user interaction parameter associated with the given one of the first plurality of training digital objects based on click data of the past users.

5. The method of claim 4, wherein the click data includes data of at least one click of at least one past user made in response to submitting the respective training search query associated with the given one of the first plurality of training digital objects.

6. The method of claim 1, further comprising, prior to the training the machine learning model to determine the respective relevance parameter of the given in-use digital object:

receiving, by the at least one processor, a third plurality of training digital objects, a given one of the third plurality of training digital objects being associated with:

(i) the respective training search query used for generating the given one of the third plurality of training digital objects; and (ii) a respective second assessor-generated label indicative of how relevant, to the respective training search query, the given one of the third plurality of training digital objects is as perceived by the respective human assessor that has assigned the respective second assessor-generated label;

training, in a third training phase following the second training phase, based on the third plurality of training digital objects, the machine learning model for determining a respective refined synthetic assessor-generated label of the given in-use digital object, the respective refined synthetic assessor-generated label being indicative of how relevant, to the respective in-use search query, the given in-use digital object is as perceived by the respective human assessor if the given in-use digital object is presented to the respective human assessor;

applying, by the at least one processor, the machine learning model to the first augmented plurality of training digital objects to augment a given one of the first augmented plurality of training digital objects with the respective refined synthetic assessor-generated label, thereby generating a second augmented plurality of training digital objects; and training the machine learning model to determine the respective relevance parameter of the given in-use digital object based on the second augmented plurality of training digital objects.

7. The method of claim 6, wherein a given one of the first plurality of training digital objects, the second plurality of training digital objects, and the third plurality of training digital objects is at least partially different from any other one of the first plurality of training digital objects, the second plurality of training digital objects, and the third plurality of training digital objects.

8. The method of claim 6, wherein a given one of the first plurality of training digital objects, the second plurality of training digital objects, and the third plurality of training digital objects is of a greater size than a subsequent respective one of the first plurality of training digital objects, the second plurality of training digital objects, and the third plurality of training digital objects.

9. The method of claim 1, further comprising, after the training the machine learning model to determine the respective relevance parameter of the given in-use digital object:

receiving, by the at least one processor, a third plurality of training digital objects, a given one of the third plurality of training digital objects being associated with:

(i) the respective training search query used for generating the given one of the third plurality of training digital objects; and (ii) a respective second assessor-generated label indicative of how relevant, to the respective training search query, the given one of the third plurality of training digital objects is as perceived by the respective human assessor that has assigned the respective second assessor-generated label;

training, based on the third plurality of training digital objects, the machine learning model to determine a respective refined relevance parameter of the given in-use digital object, the respective refined relevance parameter being indicative of how relevant the given in-use digital object is to the respective in-use search query.

10. The method of claim 9, wherein a given one of the first plurality of training digital objects, the second plurality of training digital objects, and the third plurality of training digital objects is at least partially different from any other one of the first plurality of training digital objects, the second plurality of training digital objects, and the third plurality of training digital objects.

11. The method of claim 9, wherein a given one of the first plurality of training digital objects, the second plurality of training digital objects, and the third plurality of training digital objects is of a greater size than a subsequent respective one of the first plurality of training digital objects, the second plurality of training digital objects, and the third plurality of training digital objects.

12. The method of claim 9, wherein the third plurality of training objects and the second plurality of training digital objects are the same.

13. The method of claim 1, wherein:

in the first training phase, the machine learning model is trained to determine a rough initial estimate of the respective relevance parameter of the given in-use digital object; and in each subsequent training phase, the machine learning model is trained to improve the rough initial estimate.

14. The method of claim 13, wherein improvement of the rough initial estimate is determined using a normalized discounted cumulative gain metric.

15. The method of claim 1, wherein the machine learning model is a transformer-based learning model.

16. The method of claim 1, wherein the machine learning model comprises at least two learning models, and wherein:

a first one of the two learning models is trained to determine the respective synthetic assessor-generated label for the given in-use digital object for generating the first augmented plurality of training digital objects;

and a second one of the two learning models is trained to determine the respective relevance parameter of the given in-use digital object, based on the first augmented plurality of training digital objects.

17. The method of claim 16, wherein the first one of the two learning models is different from the second one.

18. The method of claim 1, further comprising ranking the in-use digital objects in accordance with respective relevance parameters associated therewith.

19. The method of claim 1, further comprising ranking the in-use digital objects based on respective relevance parameters associated therewith, the ranking comprising using an other learning model having been trained to rank the in-use digital objects using the respective relevance parameters generated by the machine learning model as input features.

20. A system for training a machine learning model to rank in-use digital objects, a given in-use digital object generated using a respective in-use search query, the system comprising:

at least one processor;

a memory coupled to the at least one processor; and a machine learning training module residing in the memory and executed by the at least one processor, the machine learning training module comprising instructions that, when executed by the at least one processor, cause the at least one processor to:

receive a first plurality of training digital objects, a given one of the first plurality of training digital objects being associated with a past user interaction parameter indicative of user interaction of past users with the given one of the first plurality of training digital objects;

train, in a first training phase, based on the first plurality of training digital objects, the machine learning model for determining a respective predicted user interaction parameter of the given in-use digital object, thereby generating a first plurality of weights of the machine learning model, the respective predicted user interaction parameter being indicative of a user interaction of future users with the given in-use digital object;

receive a second plurality of training digital objects, a given one of the second plurality of training digital objects being associated with:

(i) a respective training search query used for generating the given one of the second plurality of training digital objects; and (ii) a respective first assessor-generated label indicative of how relevant, to the respective training search query, the given one of the second plurality of training digital objects is as perceived by a respective human assessor that has assigned the first respective assessor-generated label;

train, in a second training phase following the first training phase, based on the second plurality of training digital objects, the machine learning model having the first plurality of weights for determining a respective synthetic assessor-generated label of the given in-use digital object, thereby adjusting the first plurality of weights to generate a second plurality of weights of the machine learning model, the respective synthetic assessor-generated label being indicative of how relevant, to the respective in-use search query, the given in-use digital object is as perceived by the respective human assessor if the given in-use digital object is presented to the respective human assessor;

apply the machine learning model having the second plurality of weights to the first plurality of training digital objects to augment the given one of the first plurality of training digital objects with the respective synthetic assessor-generated label, thereby generating a first augmented plurality of training digital objects;

train the machine learning model based on the first augmented plurality of training digital objects to determine a respective relevance parameter of the given in-use digital object, thereby adjusting the second plurality of weights to generate a third plurality of weights of the machine learning model, the respective relevance parameter being indicative of how relevant the given in-use digital object is to the respective in-use search query; and use the machine learning model having the third plurality of weights for ranking the in-use digital objects.

* * * * *